US011315052B2

(12) United States Patent
Chanasyk et al.

(10) Patent No.: US 11,315,052 B2
(45) Date of Patent: Apr. 26, 2022

(54) SYSTEM AND METHOD FOR TRACKING AGRICULTURAL COMMODITIES, E.G. CROP INVENTORIES

(71) Applicant: BRANDT INDUSTRIES LTD., Regina (CA)

(72) Inventors: Larry Chanasyk, Regina (CA); Cameron Bodie, Regina (CA); Brian Classen, Regina (CA); Michael Kaeding, Regina (CA); Nick Ryder, Regina (CA)

(73) Assignee: Brandt Industries Ltd., Regina (CA)

( * ) Notice: Subject to any disclaimer, the term of this patent is extended or adjusted under 35 U.S.C. 154(b) by 1127 days.

(21) Appl. No.: 14/305,879

(22) Filed: Jun. 16, 2014

(65) Prior Publication Data

US 2014/0372166 A1 Dec. 18, 2014

Related U.S. Application Data

(60) Provisional application No. 61/835,137, filed on Jun. 14, 2013.

(51) Int. Cl.
*G06Q 10/06* (2012.01)
*G06Q 50/02* (2012.01)

(52) U.S. Cl.
CPC ....... *G06Q 10/06313* (2013.01); *G06Q 50/02* (2013.01)

(58) Field of Classification Search
USPC ....................................................... 414/294
See application file for complete search history.

(56) References Cited

U.S. PATENT DOCUMENTS

| 7,089,117 | B2 | 8/2006 | Maertens | |
|---|---|---|---|---|
| 2003/0182260 | A1* | 9/2003 | Pickett | G06Q 10/06 |
| 2004/0194447 | A1 | 10/2004 | Maertens | |
| 2005/0040222 | A1* | 2/2005 | Robinson | A01C 1/00 |
| | | | | 235/375 |
| 2006/0169776 | A1* | 8/2006 | Hornbaker | G06K 19/04 |
| | | | | 235/385 |

(Continued)

OTHER PUBLICATIONS

Luis, A Review of Wireless Sensor Technologies and Applications in Agriculture and Food Industry: State of the Art and Current Trends, 2009, Sensors, vol. 9, 4728-4750 (Year: 2009).*

(Continued)

*Primary Examiner* — Hafiz A Kassim
*Assistant Examiner* — Zahra Elkassabgi
(74) *Attorney, Agent, or Firm* — Frost Brown Todd LLC; Nicole M. Tepe

(57) ABSTRACT

A system and a method for tracking agricultural commodities, such as crop inventories, is based on measuring a flow of crop through an equipment unit during a period of time, and determining the flow of crop through the unit to be a transfer event. More particularly, there is measured a quantity of crop in a first equipment unit; followed by a detection of a presence of one or more additional equipment units proximate the first equipment unit; and by a determination of at least one crop transfer event between the first equipment and at least one of the additional equipment units based on a change in the quantity of crop in the first equipment unit and the detection of presence.

27 Claims, 4 Drawing Sheets

(56) References Cited

U.S. PATENT DOCUMENTS

2013/0024330 A1* 1/2013 Christie ............... G01S 5/0027
  705/28
2014/0121807 A1* 5/2014 Jung ............... G06Q 10/06313
  700/115

OTHER PUBLICATIONS

Canadian Office Action dated Aug. 18, 2020 for Application No. CA 2,854,497, 6 pgs.

* cited by examiner

SYSTEM AND METHOD FOR TRACKING AGRICULTURAL COMMODITIES, E.G. CROP INVENTORIES

CROSS REFERENCE TO RELATED APPLICATIONS

This application is a non-provisional entitled "SYSTEM AND METHOD FOR TRACKING AGRICULTURAL COMMODITIES, E.G. CROP INVENTORIES", which claims priority to Provisional Patent Application No. 61/835,137, filed on Jun. 14, 2013, and entitled "SYSTEM AND METHOD FOR TRACKING AGRICULTURAL COMMODITIES, E.G. CROP INVENTORIES" the entirety of which is incorporated herein by reference.

FIELD

The present subject-matter relates tracking of inventory of harvested crop, and more particularly to systems and methods for tracking inventory of crop based on detection-based transfers between equipment units.

INTRODUCTION

Modern farming operations continuously seek to improve productivity and workflow.

SUMMARY

It would thus be highly desirable to be provided with a system or method that would at least partially address the disadvantages of the existing technologies.

The embodiments described herein provide in one aspect a method for tracking crop inventory, the method comprising measuring of quantity of crop in a first equipment unit; detecting presence of one or more additional equipment units proximate the first equipment unit; and determining at least one crop transfer event between the first equipment and at least one of the additional equipment units based on a change in the quantity of crop in the first equipment unit and the detecting of presence.

The embodiments described herein provide in another aspect a system for tracking grain inventory, the system comprising: a memory; and a processor configured for measuring of quantity of crop in a first equipment unit; detecting presence of one or more additional equipment units proximate the first equipment unit; and determining at least one crop transfer event between the first equipment and at least one of the additional equipment units based on a change in the quantity of crop in the first equipment unit and the detecting of presence.

The embodiments described herein provide in another aspect a tracking unit for an equipment unit for harvesting crop, the tracking unit comprising: a recording module for measuring quantity of crop in the first equipment unit; a sensor for detecting presence of one or more additional equipment units proximate the first equipment unit; a communications module for transmitting the measured quantity of crop and the detected presence of one or more additional equipment units; and a calculation unit for determining at least one crop transfer event between the first equipment and at least one of the additional equipment units based on a change in the quantity of crop in the first equipment unit and the detecting of presence.

DRAWINGS

For a better understanding of the embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

Figure 1:
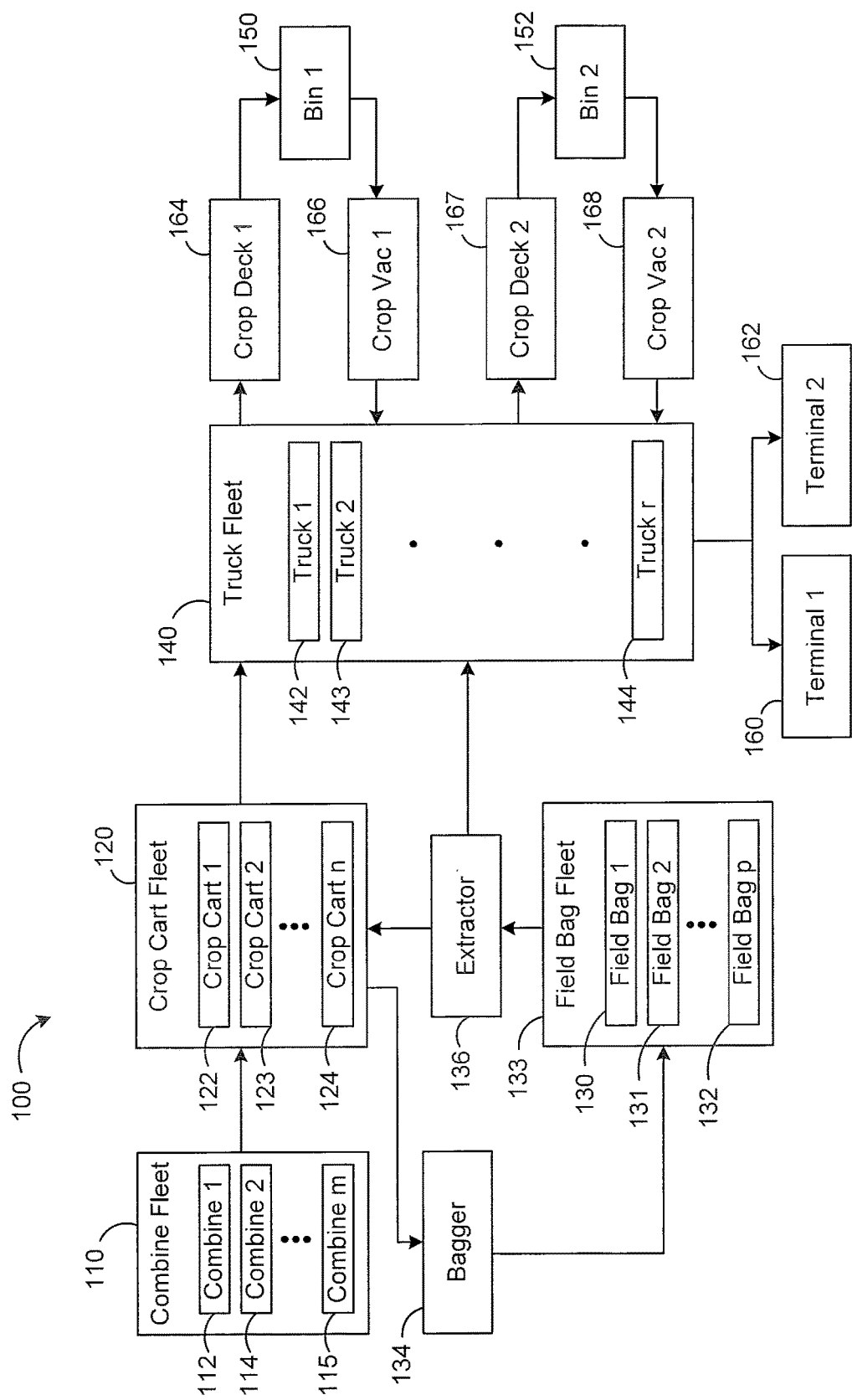
FIG. 1 illustrates a schematic diagram of units in an exemplary crop harvesting operation.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

"Equipment unit" herein refers to a piece of equipment operable to hold or transfer a quantity of the harvested crop. The crop held by the equipment unit can be either stored or transported by the equipment unit.

"Measure-enabled equipment unit" herein refers to one type of equipment unit that can measure quantity of crop held by or transferred by that equipment unit independently of any interaction with another equipment unit. A measured-enabled equipment unit can have one or more unit-mounted measuring sensors for measuring the quantity of the crop held by it. Alternatively the measure-enabled equipment unit includes one or more input mechanisms and output mechanisms and the quantity of the crop held by, or transferred through, the equipment unit is measured by tracking the flow of the crop in and out of the equipment unit through the input and output mechanisms.

"Flow type equipment unit" herein refers to one type of equipment unit that cannot measure the quantity of crop held by it independently of an interaction with another equipment unit. A quantity of crop can be associated to a flow type equipment unit to indicate the quantity of crop in the equipment unit. The associated quantity of crop can be determined by tracking crop transfer events between the flow type equipment unit and a measure-enabled equipment unit.

"Crop transfer event" herein refers to movement of a quantity of crop between a first equipment unit and a second equipment unit. A crop transfer event can be characterized as a loading type transfer event or unloading type transfer event for a particular equipment unit depending on its role in the crop transfer event. For example where crop is transferred from a first equipment unit to a second unit, the transfer event is an unloading type event for the first equipment unit and the same transfer event is a loading type event for the second equipment unit.

"In proximity of" or variants there of herein refers to an equipment unit being sufficiently near another equipment unit such that crop can be transferred between the equipment units. It will be understood that the exact distance between the two equipment units for the transfer event to occur will vary depending on the type of equipment, namely the type of mechanism used for transferring the crop.

Referring now to FIG. 1, therein illustrated is a schematic diagram of units in an exemplary crop harvesting operation 100. The harvesting operation 100 can be applied to the harvesting of grains or other suitable types of agricultural crop. It can be applied to any commodity crop that can be measured or tracked based on a unit of weight or a unit of volume.

According to the exemplary crop harvesting operation 100, a combine fleet 110 having a plurality of crop combines 112, 114, 115 is used to gather crop grown in the crop fields. Combines 112, 114, 115 of the combine fleet 110 are equipment units in the process 100 for harvesting crop. The combines 112, 114, 115 of the combine fleet 110 can be flow type equipment units, measure-enabled equipment units or a mixture of the two. Each of the combines 112, 114, 115 of the combine fleet 110 can be uniquely identifiable within the harvesting operation 100. As shown in FIG. 1, and by way of example only, combines 112, 114, 115 of the combine feet 110 are identified by a number from 1 to m, but a more elegant identification scheme may be used.

According to one exemplary embodiment, each combine 112, 114, 115 has mounted on it an identification device, which allows it to be identified when interacting with another equipment unit in the harvesting operation 100. For example, the identification device is a wireless device (which may be active or passive), such as a near field tag or radio frequency ID, which can be detected by another equipment unit one in the proximity of the combine.

For example crop harvested by a combine is temporarily stored in the hopper of the combine, which can have a size of approximately 300 bushels.

The exemplary harvesting process 100 further includes a crop cart fleet 120 for receiving crop harvested by the combines 112, 114, 115 of the combine fleet 110. Crop carts 122, 123, 124 of the crop cart fleet 120 are equipment units in the harvesting process 100. The crop carts are measure-enabled equipment units. For example, each crop cart 122, 123,124 can have mounted thereon a measuring scale for measuring the weight of crop held in the crop cart 122. Other methods of measuring the quantity of crop would include a bin level sensor whether it be ultrasonic or infrared, the use of sensors that when submerged in the crop would indicate the depth of the product in the cart or even more sophisticated methods that would provide a three-dimensional image of the crop in the cart. The measured weight provides an indication of the quantity of crop held by a crop cart 122, 123, 124. Each of the crop carts 122, 123, 124 of the crop cart fleet 120 can be uniquely identifiable within the harvesting operation 100. As shown in FIG. 1, and by way of example only, crop carts 122, 123, 124 of the crop cart fleet 120 are identified by a number from 1 to n.

According to one exemplary embodiment, each crop cart 122, 123, 124 has mounted on it an identification device, which allows it to be identified when interacting with another equipment unit in the harvesting operation 100. For example, the identification device is a wireless device (which may be active or passive), such as a near field tag or radio frequency ID, which can be detected by another equipment unit in the proximity of the crop car 122, 123, 124.

For example crop received from a combine 112, 114, 115 is temporarily stored in the hopper of the crop cart, which can have a size of approximately 600 to 2000 bushels.

According to the exemplary harvesting operation 100, crop held in the crop carts 122, 123, 124 of the crop cart fleet 120 can be transferred to either one or more field bags 130, 131, 132 of the field bag fleet 133 via bagger 134. In cases where a crop field is very large, it may be inefficient to constantly drive a crop cart 122 to the edge of the field so that the harvested crop can be loaded onto transportation trucks. In these cases, field bag 130, 131, 132 of field bag fleet 133 provide for temporary storage of harvested crop in the crop fields. The temporarily stored harvested crop can be collected at a later time and transported to the edge of the field.

Bagger 134 can be provided within the harvesting process 100 to operate the transfer of crop held within a crop cart 122, 123, 124 to a field bag 130, 131, 132. For example, the bagger can be an equipment unit that receives crop in a hopper, the crop in the hopper being funneled down to a loading mechanism that packs the crop into a plastic bag. As the crop is packed into the bag the force of the crop against the loading mechanism moves the bagger so that as the crop is being packed in the bag the bag is laid on the ground in a long tubular shape. Once all the crop is loaded into the bag the ends of the bag are sealed so the crop can be stored for extended periods of time. A bagger would typically be considered as a flow-type equipment unit however a bagger could be configured with a flow measurement device in the form of an optical mass flow sensor or a pressure plate sensor configured to determine mass flow through the bagger in which case the bagger could then be configured to calculate the total product loaded into the field bag 130, 131, 132. In this configuration the bagger would be considered measure-enabled equipment unit. Extractor equipment 136 can also be provided within the harvesting operation 100 to operate the transfer of crop held within a field bag 130, 131, 132 to either a crop cart 122, 123, 124 or a truck 142, 143, 144.

Alternatively, the bagger 134 acts as an input mechanism for a field bag 130, 131, 132. As crop is transferred from a crop cart 122, 123, 124 through the bagger 134 to a field bag 130, 131, 132 the flow rate of crop through the bagger 134 can be monitored to determine a quantity of crop that is transferred. The quantity transferred can then be used to update an amount of crop held within a field bag 130, 131, 132. Similarly as crop is transferred from a field bag 130, 131, 132 through the extractor 136 to a crop cart 122, 123, 124 or a truck 142, 143, 144, the flow rate of crop through the extractor can be measured to determine the quantity of crop unloaded from a field bag 130, 131, 132. The quantity of crop unloaded can then be used to update a previously known quantity of crop held within a field bag 130, 131, 132.

Each of the field bag 130, 131, 132 of the field bag fleet 133 can be uniquely identifiable within the harvesting operation 100. As shown in FIG. 1, and by way of example only, field bags 130, 131, 132 of the field bag fleet 133 are identified by a number from 1 to p.

According to one exemplary embodiment, each field bag 130, 131, 132 has mounted on it an identification device, which allows it to be identified when interacting with another equipment unit in the harvesting operation 100. For example, the identification device is a wireless device (which may be active or passive), such as a near field tag or radio frequency ID, which can be detected by another equipment unit when in proximity of the field bag.

For example crop received from a crop cart 122, 123, 124 is temporarily stored in field bag 130, 131, 132, which can have a size of approximately 2000 to 10000 bushels.

According to the exemplary harvesting process 100, truck fleet 140 having a plurality of trucks 142, 143, 144 are used to transport crop harvested at the crop fields to storage bins 150, 152 or terminals 160, 162. In some situations, field bags 130, 131, 132 are loaded with crop and deposited within the crop field. The crop held by the field bags 130, 131, 132 are transferred to crop carts 122, 123, 124 by the extractor 136, and the crop carts 122, 123, 124 will subsequently bring the carts to the edge of the field to be loaded onto transportation trucks 142, 143, 144. In other situations, field bags 130, 131, 132 are loaded with crop and located at the edge of the crop fields. This may be the case where more grain is being harvested than can be transported by the trucks 142, 143, 144 of the truck fleet 140. The harvested crop are temporarily loaded into field bags 130, 131, 132 located on the edge of the crop field awaiting arrival of further transportation trucks 142, 143, 144. With the availability of transportation trucks, crop loaded in the field bags can be transferred through the extractor 136 to the trucks 142, 143, 144.

Each of the truck 142, 143, 144 of the truck fleet 140 can be uniquely identifiable within the harvesting operation 100. As shown in FIG. 1, and by way of example only, trucks 142, 143, 144 of the truck fleet 140 are identified by a number from 1 to r.

According to the exemplary crop harvesting operation 100, the truck fleet 140 is used to transport crop from the crop field to either off-site storage locations such as storage bins 150, 152 or directly to the terminals 160, 162. Trucks 142, 143, 144 of the truck fleet 140 can be flow type equipment units, measure-enabled equipment units or a mixture of the two. Each of the truck 142, 143, 144 of the truck fleet 140 can be uniquely identifiable within the harvesting operation 100. As shown in FIG. 1, and by way of example only, trucks 142, 143, 144 of the truck fleet 140 are identified by a number from 1 to r.

According to one exemplary embodiment, each truck 142, 143, 144 has mounted on it an identification device, which allows it to be identified when interacting with another equipment unit in the harvesting operation 100. For example, the identification device is a wireless device (which may be active or passive), such as a near field tag or radio frequency ID, which can be detected by another equipment unit when in proximity of the truck. The near field tag could include the commodity number, the seed lot number, and the genetic-modified identification number.

For example, the transportation trucks 142, 143, 144 can each have a crop capacity of approximately 1000 bushels to 1600 bushels.

According to the exemplary crop harvesting operation 100, transportation trucks 142, 143, 144 can transport crop from crop carts 122, 123, 124 and field bags 130, 131, 132 to one or more of the plurality of storage bins 150, 152. Storage bins 150, 152 are measure-enabled equipment unit in the harvesting process 100. For example some of the storage bins 150, 152 can have mounted thereon a measuring scale for measuring the weight of crop held in the storage bin. While FIG. 1 shows two storage bins 150, 152, it will be understood that the exemplary harvesting operation can deploy any number of storage bins 150, 152 as required.

According to one exemplary embodiment, a storage bin 150, 152 is operably connected to an input crop deck 164, 167 and an output crop vac 166, 168. As crop is transferred from a transportation truck 142, 143, 144 through a crop deck 164, 167 to a storage bin 150, the flow rate of crop through the crop deck 164, 167 can be measured and recorded to determine the quantity of crop that is transferred. For example, the crop deck 164, 167 can have an auger, which further has an auger scale. During transferring of crop through the crop deck 164, 167, the flow rate of crop through the auger can be determined based on an instantaneous speed of the auger and a quantity of crop found within the auger determined based on weight of crop in the auger, or through the use of a mass flow measurement system as described for the bagger 134. Taking a total, or integration, of the mass flow over the time at which the crop is transferred allows determination of the quantity of crop that is transferred. The quantity of crop stored within the storage bin 150 can then be determined based on the quantity transferred and a known value of quantity of crop stored prior to the transferring. A similar determination may be made for determining the amount of crop transferred out of a storage bin 150, 152 through the crop vac 166, 168 back onto one of the trucks 142, 143, 144 of the truck fleet 140. For example the crop vac 166, 168 is also an auger similar to the auger of the crop deck 164, 167 and a quantity flowing through the auger of the crop vac 166, 168 can be determined in a similar manner. Crops transferred out of a storage bin 150, 152 through the crop vac 166, 168 onto one of the transportation trucks 142, 143, 144 of the truck fleet 140 can then be transported to a terminal 160/162.

Terminals 160, 162 herein refer to a point within the harvesting operation 100 where the harvested crop exits the operation and no longer needs to be tracked. Terminals 160, 162 can represent delivery of harvested crop to a customer. For example terminals 160, 162 can be crop elevators used to load the crop onto mass transportation equipment, such as containers of a train or transportation barge.

Figure 2:
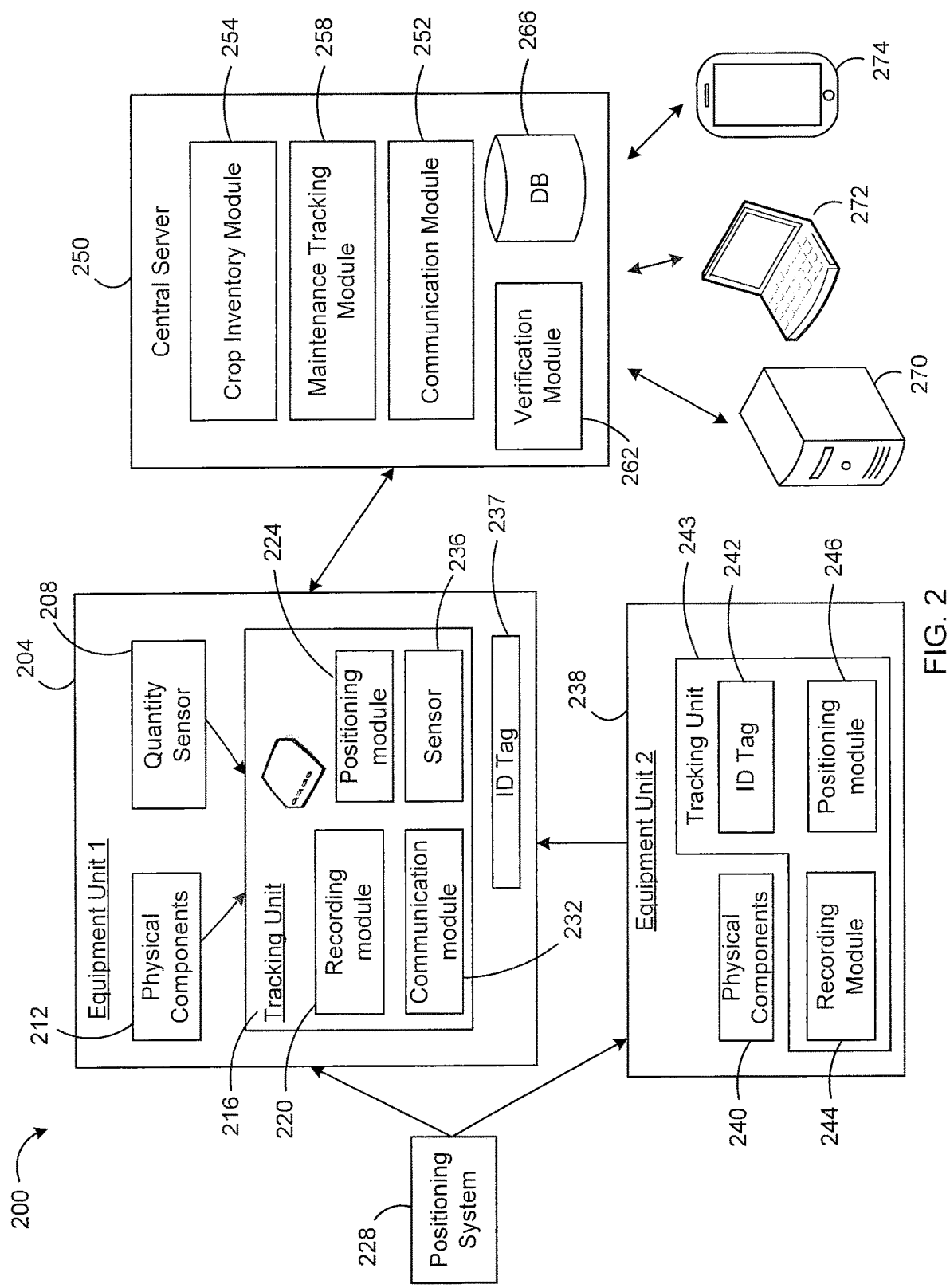
FIG. 2 illustrates a schematic diagram of an exemplary system for tracking crop inventory.

Referring now to FIG. 2, therein illustrated is a schematic diagram of an exemplary system 200 for monitoring crop inventory during crop harvesting operation 100. The system includes a first equipment unit 204, which is a measure-enabled equipment unit 204.

The first equipment unit 204 includes a quantity sensor 208 for measuring a quantity of crop held by or transferred through the first equipment 204. As described herein, the quantity sensor 208 can be a measuring sensor mounted on the first equipment unit 204. For example, a crop cart 122 can have a unit-mounted scale for weighing the amount of crop held by the cart 122. In some examples, the quantity sensor 208 can be one or more sensors mounted on input mechanisms and output mechanisms attached to the equipment unit, and the quantity sensor measures the flow rate of crop in and out of or through the equipment unit. The quantity sensor 208 can be an analog sensor, for example used on older or existing models of equipment units 204. Alternatively the quantity sensor 208 is enabled to output a digital signal representing the quantity measured. Many grain carts are sold already equipped with the quantity sensor 208.

The first equipment unit 204 further includes one or more physical components 212. Physical components of the equipment unit 204 refer to machinery mounted on the first equipment unit 204 and to be used to carry out the functions of the equipment unit 204. In some examples, the physical components 212 can indicate when the first equipment unit 204 is carrying out a crop loading or crop unloading action. For example, input mechanism or output mechanisms can emit a signal when operating to indicate a crop loading or crop unloading action. According to one exemplary embodiment, the indication from the physical components 212 can be used to detect a crop transfer event.

A tracking unit 216 is provided in the equipment unit 204. The tracking unit 216 receives crop quantity data outputted from the quantity sensor 208. Where the quantity sensor 208 outputs an analog signal, the tracking unit 216 can include an analog-to-digital converter for converting the analog signal from the quantity sensor 208 into a digital signal. Alternatively, the analog-to-digital convertor can be installed onto the quantity sensor 208 externally of the tracking unit 216.

The tracking unit 216 includes a recording module 220. The recording module 220 receives from the quantity sensor 208 measurements of the crop quantity in the equipment unit 204. For example, the recording module 220 periodically (at regular intervals or irregular intervals) queries the quantity sensor 208 to obtain measurements of the crop quantity in the equipment unit 204 over time. The received measurements of the crop quantity over time are initially stored locally within the recording module. It will be appreciated that the stored measurements of crop quantity over time provides historical data of crop quantity in the equipment unit 204.

According to some exemplary embodiments, the tracking unit 216 may further include a positioning module 224 for determining the location of the equipment unit 204. For example, the positioning module 224 communicates with an external positioning system 228, which provides information that allows the positioning module 224 to determine the location of the equipment unit 204. For example, the positioning system 228 is a global positioning system (GPS) and the positioning module 224 is a GPS receiver. For example, the positioning system 228 is a network of ground systems, such as cellphone towers, and the positioning module 224 communicates with one or more of the systems to determine its location based on its distance from the systems. According to various embodiments where the equipment unit 204 includes a positioning module 224 that determines location of the equipment unit 204, the locations of the equipment unit 204 over time can be recorded. For example, recording module 220 receives data from the positioning module 224 pertaining to the location of the unit 204. Location of the unit 204 over time is initially stored locally within the recording module. It will be appreciated that the stored location of unit 204 over time provides historical data of the location of the equipment unit 204.

According to various exemplary embodiments where the physical components 212 of the equipment unit 204 are enabled to indicate when the first equipment unit 204 is carrying out a crop loading or crop unloading action, these indications can be received by the recording module 220 and stored within the recording module 220. The times at which these unloading or loading actions are carried out are also stored.

The tracking unit 216 further includes a communication module 232 for communicating with an external device. In particular, communication module 232 allows the tracking unit 216 to communicate with a remote central server 250. For example, the communication module 232 acts as a communication device to carry out wireless communication while operating in multiple communication modes. For example the communication module 232 of the tracking 216 operating as a mobile communication device may operate in multiple frequency bands using a single communication protocol, such as GSM/GPRS. The communication module 232 operating as a model mobile communication module 232 may also operate in multiple communication protocols, such as 2G, 3G, 4G, and LTE. The communication module 232 can operate in such communication modes to communication with the remote central server 250 over a suitable network, such as a cell network, internet network or combination thereof.

In other exemplary embodiments, the communication module 232 communicates with the remote central server 250 through an intermediate device that is enabled to carry out wireless communication. For example, the communication module 232 can be in wired or wireless communication with the intermediate device, and subsequently the intermediate device communicates with the remote central server 250. For example, the intermediate device can be a smartphone or tablet device enabled to carry out wireless communication in the modes described above, and the tracking unit 216 can be connected via USB (wired) or Bluetooth (wireless) to the intermediate device.

The communication module 232 can transmit data stored by the recording module 220 or positioning module 224 to the server 250. Received measurements of the crop quantity over time stored within the recording module 220 can be transmitted from time to time by the communication module 232 to the server 250. When transmitting data from the tracking unit 216 to the server 250, the unique identifier of the equipment unit 204 is also transmitted to allow the server 250 to identify the unit 204. Where location of the equipment unit 204 over time is stored, this data can also be sent to the server 250. Where loading and unloading actions of the physical components of the equipment unit 204 are stored by the recording module 220, this data can also be sent to the server 250.

The tracking unit 216 further includes an identification device sensor 236 for sensing the presence of the identification device of another equipment unit when it is in proximity of the equipment unit 204. The type of sensor 236 can be selected based on the types of identification devices used on other equipment units.

According to various exemplary embodiments, the tracking unit 216 can include a calculation unit, which may be implemented as part of the recording module 220. The calculation unit is operable to carry out various mathematical operations or computational steps may be locally executed by the tracking unit 216 based on real time data received from the quantity sensor 208, physical components 212 or communications module. Based on detection of an additional equipment unit in proximity of the first equipment unit 204 and on a change of the measured crop quantity from the quantity sensor 208, the tracking unit 216 can determine whether a crop transfer event with the additional equipment unit is occurring. The tracking unit 216 can further determine if a crop transfer event is occurring based on indications from the physical components 212.

Accordingly some exemplary embodiments, based on indications from the physical components 212 of loading and unloading events actions, and/or determinations of occurrences crop transfer events, the tracking unit 216 can further determine a maintenance state of the equipment unit 204. In particular, the number of crop transfer events performed by the equipment unit 204 can be compared against a maintenance schedule having predetermined crop transfer event indications, to determine whether one or more components of the equipment unit 204 is due for maintenance.

The tracking unit 216 may further include a UI module, which can present one or more data received or calculated at the tracking unit 216 to a human operator. For example, the tracking unit 216 can have its own display device for presenting control interface and data. The tracking unit 216 can further have a user input device allowing the operator to enter various commands. Where the tracking unit 216 is in communication with an intermediate device, such as a smartphone, computer, or tablet, having a display and input device and various control interface and data can be sent from the UI module to the display of the intermediate device.

Various functions of the tracking unit 216 may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

For example, the tracking unit 216 can be implemented as digital box to be connected with electronics of the equipment unit 204. In various exemplary embodiments, tracking unit 216 can be adapted and existing equipment units can be retrofitted through installation of the tracking unit. For example, the tracking unit can be powered by a battery of the equipment unit 204, such as a 12V DC battery of a vehicle. In other exemplary embodiments, tracking unit 216 is provided with a newly built equipment unit and various modules of the tracking unit 216 can be connected to or embedded with other electronic components of the newly build equipment unit.

Equipment unit 204 further includes a unit-mounted identification device 237. The identification device 237 may be included as part of the tracking unit 216 or separately mounted onto the equipment unit 204. The unit-mounted identification device 237 can further provide information regarding the type of crop in the equipment unit 204.

The second equipment unit 238 includes one or more physical components 240. Physical components of the equipment unit 238 refer to machinery mounted on the second equipment unit 238 and to be used to carry out the functions of the equipment unit 238. In some examples, the physical components 240 can indicate when the second equipment unit 238 is carrying out a crop loading or crop unloading action. For example, input mechanism or output mechanisms can emit a signal when operating to indicate a crop loading or crop unloading action. According to one exemplary embodiment, the indication from the physical components 240 can be used to detect a crop transfer event.

Second equipment unit 238 includes its unit-mounted identification device 242. The identification device 242 may be included as part of a tracking unit 243 or separately mounted onto the second equipment unit 238. According to various exemplary embodiments, in addition to allowing unique identification of the second equipment 238, the identification device 242 can further provide information regarding the type of crop in the second equipment unit 238. When the second equipment unit 238 is in proximity of the first equipment unit 204, the identification device 242 of the second equipment unit 238 can be sensed by the identification device sensor 236 of the first equipment unit 204. The identification device sensor 236 can further receive the unique identifier of the second equipment unit 238. In some exemplary embodiments, the identification device sensor 236 can further receive a type of crop held in the second equipment unit 238.

According to various exemplary embodiments the second equipment unit 238 further includes a positioning module 246 and recording module 244. The positioning module 246 determines the location of the second equipment unit 238 in a similar manner as positioning module 224 of the first equipment unit 204. The location of the second equipment unit 238 can be recorded over time at the recording module 244. Other data such as transfer events as detected from physical components 240 and maintenance state of the second equipment unit 238 can also be recorded by the recording module 244 of the second equipment unit 238.

According to various exemplary embodiments, the identification device 242, recording module 244 and positioning module 246 can be provided together as part of a second tracking unit 243.

The first equipment unit 204 may further include an operator identification device. The second equipment unit 238 may also further include an operator identification device. The operator identification device is carried by a human operator operating an equipment unit and allows identification of the human operator. For example, the identification device is a wireless device (which may be active or passive), such as a near field tag or radio frequency ID, which can be detected by an equipment unit when the human operator is operating that equipment unit. The operator identification device may also take the form of a smart phone or tablet with software loaded thereon, which allows it to function as described above.

A crop transfer event between the first equipment unit 204 and the second equipment unit 238 in which crop is transferred can occur between the equipment units when in proximity of one another. As shown in FIG. 2, second equipment unit 238 is illustrated as a flow-type equipment unit (ex: does not have a quantity sensor), however it will be understood that a transfer event can also occur between two measure-enabled equipment units (ex: both having quantity sensors).

Continuing with FIG. 2, the exemplary crop inventory monitoring system 200 further includes the server 250. Systems and methods of the server 250 described herein may be implemented in hardware or software, or a combination of both. However, preferably, these embodiments are implemented in computer programs executing on programmable computers, each comprising at least one processor, a data storage system (including volatile and non-volatile memory and/or storage elements), at least one input device, and at least one output device. For example and without limitation, the programmable computers may be a mainframe computer, server, personal computer, laptop, personal data assistant, cellular telephone, smartphone, or tablet device. Program code is applied to input data to perform the functions described herein and generate output information. The output information is applied to one or more output devices in a known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer for configuring and operating the computer when the storage media or device is read by the computer to perform the procedures described herein. The system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer-usable instructions for one or more processors. The medium may be provided in various forms including one or more diskettes, compact disks, tapes, chips, wireline transmissions, satellite transmissions, internet transmission or downloadings, magnetic and electronic storage media, digital and analog signals, and the like. The computer-usable instructions may also be in various forms including compiled and non-compiled code.

The server 250 includes a communications module 252 and crop inventory module 254. The server 250 may further include a maintenance tracking module 258 and a verification module 262. The server 250 may further include database 266 for storing historical data.

One or more end user devices such as desktop computer 270, laptop computer 272 and mobile device 274 can communicate with the server, for example via an user-interface, such as a web-interface. According to various exemplary embodiments, access to the web interface is user based and only authenticated users may access the information pertaining to crop inventory. The server 250 can further receive various commands from the end user devices 270, 272 and 274, such as manual updates of crop quantity associated to one or more equipment units, addition or removal of one or more equipment units that are to be tracked in the harvesting operation 100, addition or removal of one or more operator IDs that are to be tracked in the harvesting operation 100, and dispatch commands to be sent to operators operating equipment units in the field.

The server communications module 252 of the server 250 can communicate with communication modules 232 of each of the equipment units 204 of the system that is equipped with a communication module 232. It will be understood that while FIG. 2 only illustrates a single equipment unit 204 being in communication with the server 250, the server 250 can be in communication through its communication module 252 with a plurality of equipment units. The communication module 252 can receive transmissions from the equipment unit 204, including stored data transmitted from the first equipment unit 204. Data transmitted can include measurement of the crop quantity in time, location of the first equipment unit 204 in time, detected presence of nearby additional equipment units in time, maintenance state of the equipment unit 204 and occurrences of transfer events detected by the tracking unit 216.

The crop inventory module 254 determines various indicators of crop inventory during the harvesting operation 100. For example, the crop inventory module 254 receives crop quantity measurements from each of the measure-enabled equipment units used in the harvesting operation 100. The crop quantity measurements can then be used to determine a global quantity of crop that are currently in the harvesting operation 100. Since each equipment unit is uniquely identifiable, crop inventory module 254 can further determine how much crop is being individually held by each of the measure-enabled equipment units. This information allows better decision-making relating to deployment of equipment units within the harvesting operation 100. For example, this information may be useful to determine which equipment units are nearing full crop holding capacity and which units still have available capacity. For example, where many crop carts 122, 123, 124 of crop fleet 120 are nearing capacity and many field bags 130 are nearing capacity, but that the storage bins 150, 152 still have available capacity, this information aids in making a decision to deploy more trucks 142, 143, 144 to quickly transfer crop at the crop carts 122, 123, 124 and the field bags 130, 131, 132 to the storage bins 150, 151.

According to one exemplary embodiment, each of the equipment units used in the harvesting operation 100 is a measure-enabled equipment unit and the quantity of crop stored within each equipment unit is periodically transmitted to the server 250. The location of each equipment unit can also be transmitted to the server 250. Alternatively, or additionally, the server 250 may broadcast query messages querying one or more of the equipment units to transmit the quantity of crop held in the equipment units. Information pertaining to quantity of crop in each of the equipment units provides a global overview of crop inventory. For example, such information may be useful for determining a total amount of grain crop that has been harvested and is yet to be delivered. Such information may also be useful for monitoring the status of equipment units within the harvest process 100. For example, it may be useful to see when some of the equipment units are nearing capacity, and should not be chosen for further loading operation while other equipment units are under capacity and can accommodate further loading operations. Furthermore, historical data of quantity held by each equipment unit may be useful for analyzing efficiency of the harvest operation 100. Historical data may also be used to analyze usage and loads on one or more equipment units in order to determine the state of the equipment units and whether such units are nearing a scheduled maintenance.

According to one exemplary embodiment, only some of the equipment units used in the harvesting operation 100 are measure-enabled equipment units while other equipment units are of the flow type. Accordingly, crop inventory at each of the equipment units can be tracked by the crop inventory module 254 based on measurements of crop quantity received from the measure-enabled equipment units and based on crop transfer events involving the measure-enabled equipment units and flow type of equipment units. Tracking of crop inventory in this manner involving both measure-enabled equipment units and flow type equipment units is possible due to each equipment unit being uniquely identifiable.

For example, in a sub process of harvesting operation 100, flow of crop from a crop cart 122 to storage bin 152 via a transportation truck 142 can be tracked by detecting a first transfer event from the crop cart 122 to the transportation truck 142. Based on a change in the measured crop quantity in the crop cart 122 during the first transfer event, it can be determined that a corresponding, but inverse, change in crop quantity occurred at the truck 142. For example if 600 bushels of crop were unloaded from the crop cart 122 during the transfer event between the crop cart 122 and the transportation truck 142, then transportation truck 142 will be loaded with the 600 bushels. Subsequently a second crop transfer event involving truck 142 occurs at storage bins 152. If the crop deck 164 measures that 600 bushels of crop are loaded into the storage bin 152 during the second crop transfer event, it can be determined that 600 bushels of crop has been unloaded from the transportation truck 142. Between the first crop transfer event and the second crop transfer event involving the truck 142, the crop inventory module 254 can determined that the truck 142 contains 600 bushels of crop. It will be understood that this example can be applied to other measure-enabled and flow type equipment units used in the harvesting operation 100 to track crop quantity contained in each of the equipment units used in the process 100.

For one or more of the equipment units deployed in the harvesting operation, the crop inventory module 254 tracks crop quantity in the equipment units by associating a crop quantity value to each of the one or more deployed equipment units. The crop quantity value can be based on crop quantity measured by quantity sensors 208 of measure-enabled units and transmitted to the server 250. The associated crop quantity values can be updated based on details of transfer events received at the crop inventory module. The values may also be updated manually by a user interacting with the crop inventor module 254.

In addition to associating a crop quantity to each of the one or more deployed equipment units, the crop inventory module 254 may further associate a location value to each of the one or more deployed equipment units.

In addition to tracking crop quantity in the deployed equipment units, the crop inventory module 254 may further track occurrences of crop transfer events between one or more of the deployed equipment units. Occurrences of transfer events can be determined by the tracking unit 216 of an equipment unit 204 and transmitted to the server 250. Alternatively, or additionally, the server 250 can determine occurrences of transfer events between equipment units. For each occurrence of a crop transfer event, the crop inventory module 254 creates an entry for that event. Each created event can be further associated to the equipment units involved in the crop transfer event.

Figure 3:
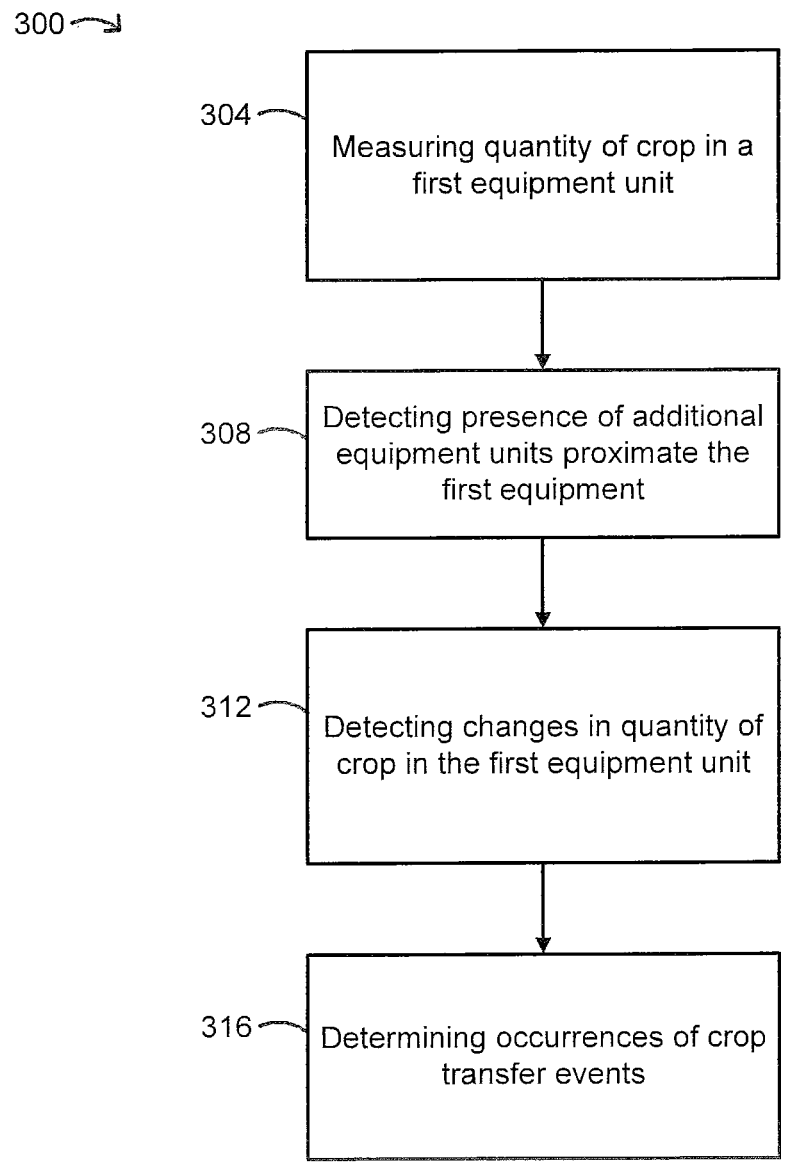
FIG. 3 is a flowchart illustrating general operational steps of an exemplary embodiment for detecting a crop transfer event.

Referring now to FIG. 3, therein illustrated is a schematic diagram of an exemplary method 300 for determining occurrences of crop transfer events involving a measure-enabled equipment unit, such as the equipment unit 204. The transfer event detection method 300 can be carried out either locally by the calculation unit of the tracking unit 216 of the first equipment unit 204. In such a case, the method 300 can be carried out based on real-time data or recently measured data, including crop quantity measurement from the quantity sensor 208 and detected identification devices from one or more additional equipment unit sensed by sensor 236. In such a case, determination of occurrences of crop transfer events can be carried out substantially in real time.

Alternatively, or in addition to, the transfer event detection method can be carried out remotely by the crop inventory module 254 of the server 250. In such a case, the method 300 can be carried out based on real-time data or recently measured data received from equipment units deployed in the harvesting operation 100. Alternatively, method 300 can be carried out based on historical measured data, including crop quantity measurement. For example, to minimize data transfer between equipment units and server 250, data stored in recording modules such as measured crop quantity, equipment unit location, and presence of additional equipment units can be initially locally stored at the tracking unit 216 and transmitted intermittently. For example, the data is transmitted only when a transfer event has occurred.

According to the exemplary method 300, at step 304 measurements of quantity of crop contained in the first equipment unit 204 are made. It will be understood that measuring of crop quantity at step 304 may refer to the controlling of the quantity sensor 208 to obtain measurements of the crop quantity and receiving the measurements at the tracking unit 216. Measuring of crop quantity at step 304 may also refer to receiving at the server 250 of crop quantity measurement data for the first equipment unit 204 transmitted by the communication module 232 of the tracking unit 216. Measuring of crop quantity at step 304 includes periodically making measurements over a duration of time.

At step 308, the presence of additional equipment units proximate the first equipment unit 204 is detected. It will be understood, that detecting of presence of additional equipment units proximate the first unit 204 may refer to the sensing by the identification device sensor 236 of identification devices of additional equipment units in proximity of the first equipment unit 204. Detecting of presence of additional equipment units proximate the first unit 204 may also refer to receiving at the server 250 data pertaining to the detection of nearby identification devices that is transmitted by the communication module 232 of the tracking unit 216. Detecting of additional equipment units in proximity at step 308 includes periodically detecting for additional equipment units in proximity.

In one exemplary embodiment, data pertaining to locations of the first equipment unit 204 and location of other equipment units such as second equipment unit 238 can be monitored and/or recorded. In this case, detecting the presence of additional equipment units proximate the first unit 204 refers to the comparing of location data in time for the first equipment unit 204 with location data in time for additional equipment units. A correspondence of the location of the first equipment unit 204 with the location of an additional equipment unit can indicate that the two units are in proximity of one another. For example this way of detecting proximity of equipment units can be carried out by the crop inventory module 254 where location data is transmitted by equipment units to the server 250.

At step 312, changes in the quantity of crop in the first equipment unit are detected. It will be understood that detecting changes in quantity of crop in the first equipment unit may refer to analyzing of measurements of crop quantity at the tracking unit 216 to determine whether sequential measurements of crop quantity show variations. Where the physical components 212, such as input or output mechanisms, provides a signals to the tracking unit 216 indicating loading or unloading actions, reception of such signals can also be used to detect changes in quantity of crop. Detecting changes in quantity of crop in the first equipment unit may also refer to analyzing of crop quantity measurement data transmitted by the communication module 232 of the tracking unit 216.

At step 316, it is determined whether a transfer event has occurred. For example, this determination can be based on the measured quantities of crop in the first equipment unit and the detection of additional equipment units in proximity of the first equipment unit 204. In particular, the measured quantity of crop is compared with detecting of presence of additional equipment units in proximity of the first equipment unit 204 to determine whether at the time the presence of an additional equipment unit is detected, a change in crop quantity also occurred. For example, this comparison may be carried out in real time at the first equipment unit 204. For example this comparison may also be carried out in real time at the server 250 based on data received from equipment units deployed in the harvesting operation. Furthermore, and for example, this comparison may also be carried out based on historical data provided to server 250.

When carrying out the comparison in real time, it is determined at the time of detecting an additional equipment unit being in proximity of the first equipment whether there has been a change in the crop quantity in the first equipment unit. For example this may require examining more than one measurements of crop quantity to discern a change in the crop quantity.

When carrying out the concordance based on historical data, the time at which the presence of the additional equipment unit is detected is determined. Recorded measurements of crop quantity at a corresponding time are then examined to discern a change in crop quantity.

In particular, if there has been a change in the crop quantity of the first measured enable equipment unit 204 at an interval of time corresponding to the interval of time at which the additional equipment unit was in proximity of the first equipment, then it is determined that a crop transfer event has occurred between the first equipment unit and the additional equipment unit.

If it is determined that a transfer event has occurred, details of the event can be logged in an event entry. An entry for the transfer event includes a time of the transfer event, the identifiers of the equipment units involved in the transfer event, and an amount of crop transferred. The transfer event entry can further include one or more of following: the type of crop that was transferred, the location where the transfer event occurred, and identifiers of human operators operating the involved equipment units.

For example, determination of occurrences of transfer events can be made at the first equipment unit 204 by the tracking unit 216. In such cases, the transfer event entries can be initially stored locally at the tracking unit 216. The transferred event entries can then be transmitted to the server 250 and stored, such as within the database 266.

For example, determination of occurrences of transfer events can be made by the crop inventory module 254 of the server 250 based on data received from equipment units. The transfer event entries can be stored, such as within database 266.

Figure 4:
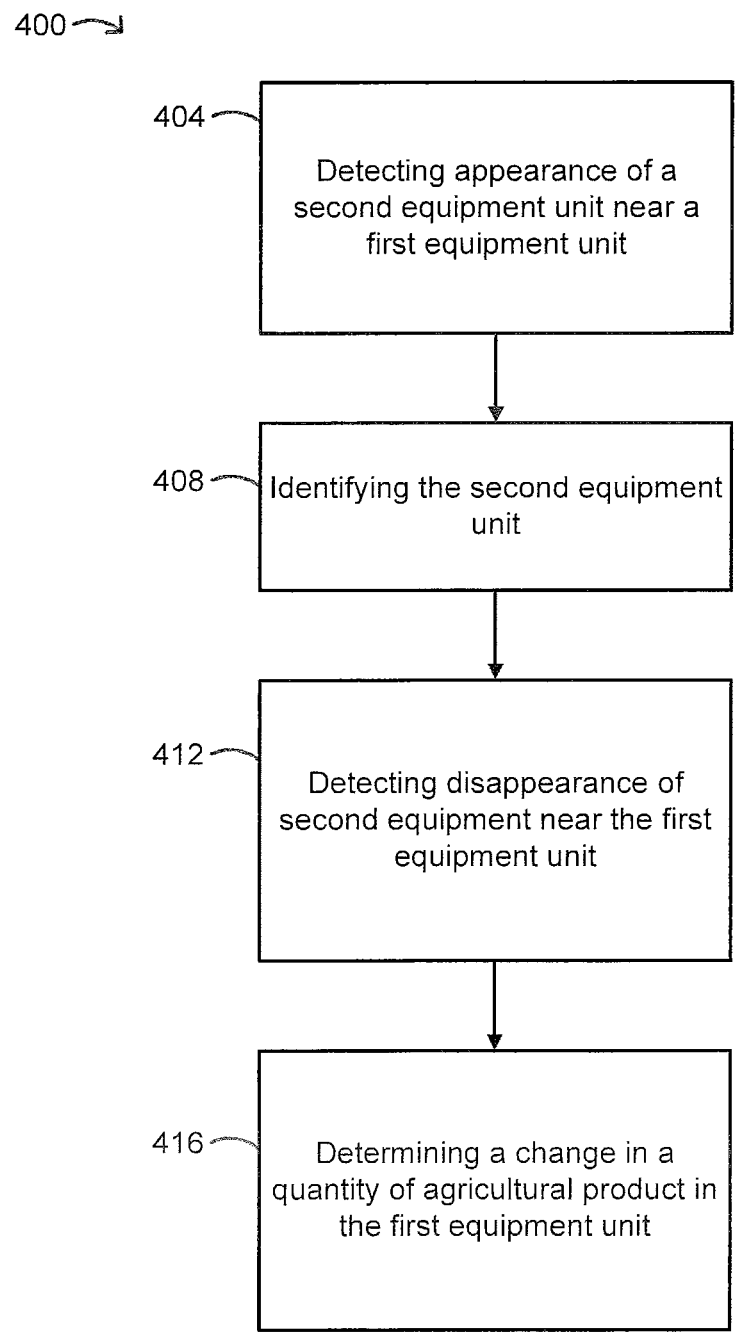
FIG. 4 is a flowchart illustrating general operation steps of an exemplary embodiment for determining a quantity of crop transferred in an event.

Referring now to FIG. 4, therein illustrated is an exemplary method 400 for determining a quantity of crop transferred during a crop transfer event. For example, exemplary method 400 can be carried out for a transfer event involving a measure-enabled equipment unit and a flow type equipment unit or an event involving two measure-enabled equipment units. For example, the method 400 can be applied for determining a crop transfer event between the first equipment unit 204 and the second equipment unit 238 illustrated in FIG. 2.

At step 404, an appearance of an additional equipment unit in proximity of the first equipment unit is detected. Appearance of the additional equipment in proximity of the first equipment herein refers to the beginning of an interval of time of continued presence of the additional equipment in proximity of the first equipment after an interval of time during which no equipment unit was in proximity of the first equipment unit. A measurement of the crop quantity in the first equipment unit 204 at the time of the appearance of the additional equipment unit may be taken.

At step 408, the additional equipment unit is identified. The identification of the additional equipment unit includes receiving an identifier of the additional equipment unit. The identification can include retrieving an indicator of the type of crop contained in the additional equipment. For example, after identifying the additional equipment unit, the first equipment unit 204 can communicate with the server 250 to indicate that it has detected the appearance of the additional equipment unit. The server 250 can then retrieve a type of crop value associated with the additional equipment unit based on previously logged transfer events for the additional equipment unit. Retrieving an indicator of type of crop contained in the additional equipment unit can be useful to ensure that different types of crops are not mixed as a result of the crop transfer. A comparison of the known type of crop contained in the first equipment unit 204 with the known type of crop contained in the additional equipment unit can be made and an alarm can be raised when there is a mismatch in the type of crops. For example, an alert about the mismatch may be displayed on a user interface on either one or both of the first equipment unit 204 and additional equipment unit. The alarm alerts the operator of the equipment unit to prevent mixture of different types of crops.

After detecting an appearance of the additional equipment unit in proximity of the first equipment unit 204 and where there is not a mismatch of crop types, the crop contained in one of the equipment units can be transferred to the other of the equipment units. During, the transferring of crop, the first equipment unit 204 monitors the presence of the additional equipment unit in its proximity. For example, the identification device sensor 236 can periodically sense or probe for the identification device of the additional equipment unit.

At step 412, a disappearance of the additional equipment unit from an area proximate the first equipment unit 204 is detected. Disappearance of the additional equipment unit in proximity of the first equipment herein refers to the end of the interval of time of continued presence of the additional equipment in proximity of the first equipment. For example, the communication module 232 failing to detect the identification device indicates the disappearance of the additional equipment unit. A further measurement of the crop quantity in the first equipment unit 204 at the time of the disappearance of the additional equipment unit may be taken.

At step 416, a change in the quantity of crop contained in the first equipment between the time of the appearance and the time of the disappearance is determined. This change of quantity represents the amount of crop that was transferred between the first equipment unit 204 and the additional equipment unit. For example, where the measured-enabled first equipment unit 204 has unit-mounted measuring sensors, the change in crop quantity can be determined by calculating a difference between the measurement of crop quantity taken at the time of the detection of the appearance of additional equipment unit and the measurement of crop quantity taken at the time of the detection of the disappearance of the additional equipment unit. For example, where the measure-enabled first equipment measures crop quantity through tracking flow of crop through input and output mechanisms, the change in crop quantity can be determined by integrating the flow rate of crop to or from the first equipment unit between the time of the detection of the appearance of additional equipment unit and the time of the detection of the disappearance of the additional equipment unit.

The quantity of crop associated to the first equipment unit 204 is updated based on measured change of crop quantity during the transfer event. Similarly, the quantity of crop associated to the additional equipment unit is also updated based on the measured change of crop quantity during the transfer event. An entry for the transfer event is created and associated with the first equipment unit 204 and the additional equipment unit involved in the transfer event.

In contrast to simply querying measure-enabled equipment units used in the harvesting operation 100, tracking transfer events provide a fluid picture of the crop flow within the harvesting process 100.

As described herein, tracking occurrences of transfer events allows for monitoring of crop contained in the equipment units used in the harvesting operation 100, including the tracking of crop contained in flow type equipment units that are not enabled to independently measure a quantity of contained crop.

According to various exemplary embodiments, providing of tracking units 216 in equipment units allows for improving efficiency of harvesting operation. For example, capacity of equipment units, such as storage bins 150, 152 can be monitored. Monitoring location of equipment units can be used to determine if an equipment unit has been deployed in the wrong crop fields. Monitoring location of equipment unit can also be used to determine if a unit is leaving a prescribed work area.

Recording of transfer events can be used to monitor flow of crop, which may be useful to determine time spent loading and unloading between equipment units, the time of travel of an equipment unit between transfer events, the total distance traveled by an equipment unit when loaded, total distance traveled by an equipment unit when unloaded.

According to various exemplary embodiments, the remote server 250 further includes a maintenance tracking module 258 for tracking the maintenance state of one or more equipment units deployed in the harvesting operation 100. According to various exemplary embodiments, tracking of occurrences of transfer events for an equipment unit allows for monitoring a maintenance state of that equipment unit. For example data such as number loading/unloading events, total distance travelled loaded, total distance travelled unloaded, time idling, distance traveled can be used to determine usage of the equipment unit. Other specific metrics like auger usage time, wheel bearing life can be determined. According to one exemplary embodiment, the number of transfer events for an equipment unit is counted, and compared with a maintenance schedule. A maintenance state of the equipment unit can be further determined from the comparison.

According to various exemplary embodiments, the server 250 further include a verification module 262 for verifying consistency of crop inventory data and detecting crop loss events. Crop loss events herein refers to events that causes inconsistency in crop inventory data reflecting quantities of crop being lost in the harvesting operation 100. For example, crop loss events can occur due to mischief, such as theft, or uncontrolled events, such as accidents.

For example, a significant change in crop quantity at a measure-enabled equipment unit at a point in time without an associated detection of another equipment unit in the proximity of the first equipment unit at a corresponding point in time indicates a possible crop loss event. For example, such a change (especially a decrease in quantity) in crop quantity can be caused by unloading of crop quantity to an unauthorized equipment unit. This can be an event of theft. Detection of such events can be logged as crop loss event, and a supervisor can be alerted to investigate the crop loss event. For example an alert can be sent to end-user devices 270, 272, and 274.

For example, according to harvest workflow operations, it can be expected that a first crop transfer event involving a particular type of equipment unit will be followed by a second expected crop transfer event. Non-occurrence of the expected second crop transfer event, for example, within a predetermined duration of time, indicates a possible crop loss event. For example, where crop contained in a crop cart 122 is loaded onto a transportation truck 142, it can be expected that within a certain amount of time, the transportation truck 142 will arrive at a storage bin 150, 152 to unload the crop into the bin. This represents the expected second crop transfer event. For example, after detecting occurrence of the first crop event by the crop inventory module 254, a reminder may be issued to the verification module 262 to verify occurrence of the expected second crop transfer event. Non-occurrence of expected second crop transfer event can be caused by the crop loaded into the truck 142 being transported to an unauthorized unit due to theft.

According to various exemplary embodiments, tracking of occurrences of transfer events along with tracking of presence of operator IDs can be useful for tracking an equipment operator performance. Equipment operator herein refers to a human operator given particular definable tasks within the harvesting operation 100. By associating a detected operator ID to logged transfer events, logged transfer events associated to an equipment operator can be retrieved to assess operator performance. For example, calculating quantities of crop transferred by various equipment units being operated by one operator ID provides an indication of the performance of the operator. Furthermore, associating operator ID to transfer events allows for determining operators that were operating an equipment unit when a crop loss event occurred, which can allow better investigation of these events.

According to various exemplary embodiments, the tracking unit 216 is enabled to display alerts on its user interface and to receive commands from an operator. For example an operator can input live updates, such as changing ETA and reason, which can be received at the server 250 and communicated to end user devices 270, 272, 274. The tracking unit 216 can further display alerts received from the server 250 corresponding to commands issued by end users 270, 272, 274. For example, daily work orders can be sent to the tracking unit 216.

According to various exemplary embodiments, one or more intermediate data collection units can be provided throughout the work area where the harvesting operation 100 is carried out. For example, when an equipment unit passes an area near where one of the data collection units is located, data locally stored by the tracking unit 216 of the equipment unit can be communicated to the intermediate data collection unit, and this data can be forwarded to the server 250. Intermediate data collection units can be deployed in areas where equipment units often pass through, such as nearby a storage bin 150. For example, collection units can have a permanent connection with the server 250.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

What is claimed is:

1. A method for tracking crop inventory, the method comprising:

storing a transfer event dataset on a memory;

measuring a first quantity of crop in a first equipment unit with a quantity sensor provided on the first equipment unit;

detecting an additional equipment unit being proximate the first equipment unit by an identification device sensor provided on the first equipment unit detecting a identification device provided on the additional equipment unit;

identifying the additional equipment unit by receiving an identifier from the identification device with the identification device sensor;

detecting a disappearance of the additional equipment unit proximate the first equipment unit with the identification device sensor;

determining, with a processor, a change in the quantity of crop in the first equipment unit between the detecting of the additional equipment unit being proximate the first equipment unit and the disappearance of the additional equipment unit proximate the first equipment unit;

determining a crop transfer event based on the change in the quantity of crop in the first equipment unit, and updating the transfer event dataset to include the crop transfer event;

tracking the quantity of crop by associating the measured quantity of crop with its associated equipment;

wherein the crop transfer event describes a transfer of crop from the first equipment unit to the additional equipment unit;

identifying the crop transfer event in the transfer event dataset based upon an association with the additional equipment unit;

identifying a subsequent crop transfer event in the transfer event dataset based upon an association with the additional equipment unit, wherein the subsequent crop transfer event occurs after the crop transfer event and before any other crop transfer event associated with the additional equipment;

comparing the crop transfer event and the subsequent crop transfer; and determining a crop loss event based on the comparing, wherein the first equipment unit is operable to hold a quantity of crop, and wherein the additional equipment unit is operable to at least one of: hold a quantity of crop; and transfer a quantity of crop.

2. The method of claim 1, wherein the change in the quantity of crop in the first equipment unit is detected based on measuring a flow of crop through the first equipment unit during a period of time.

3. The method of claim 1, further comprising:
determining a location of at least one of the first equipment unit and the additional equipment unit with a positioning module of the first equipment unit at the time of the detected change in quantity of crop; and
wherein the crop transfer event includes the determined location.

4. The method of claim 1, further comprising:
determining an amount of the change in quantity of crop in the first equipment unit with the processor; and
wherein the crop transfer event includes the amount of change.

5. The method of claim 4, further comprising:
storing a global quantity of crops on the memory, wherein the global quantity of crops describes quantities of crops associated with each of a plurality of equipment units, the plurality of equipment units comprising the first equipment unit and the additional equipment unit; and
updating the global quantity of crops based on the amount of change of the crop transfer event to reflect a new quantity of crop associated with each of the first equipment unit and the additional equipment unit.

6. The method of claim 1, wherein determining the change includes receiving a first measurement of the quantity of crop at a first time corresponding to the detecting of the additional equipment unit being proximate the first equipment unit and receiving a second measurement of the quantity of crop at a second time corresponding to the disappearance of the additional equipment unit proximate the first equipment unit.

7. The method of claim 1, wherein the quantity sensor is operable to indicate a flow rate of the crop over time, and wherein determining the change includes monitoring the flow rate of the crop to and from the first equipment unit between a first time corresponding to the detecting of the additional equipment unit being proximate the first equipment unit and a second time corresponding to the disappearance of the additional equipment unit proximate the first equipment unit.

8. The method of claim 1, further comprising:
identifying an operator of at least one of the first equipment unit and the additional equipment unit by receiving an operator identifier from an operator identification device with a communication module of the first equipment unit at the time of the detected change in quantity of crop;
wherein the crop transfer event includes the operator identifier.

9. The method of claim 1, further comprising:
receiving a crop identifier from the identification device provided on the additional equipment unit with the identification device sensor provided on the first equipment unit;
determining a type of crop associated to the additional equipment unit based on the crop identifier; and
raising an alarm on a user interface module of the first equipment unit if the type of crop associated to the additional equipment unit does not match a type of crop associated with the first equipment unit.

10. The method of claim 1, further comprising:
recording the quantity of crop in the first equipment unit over a duration of time to a recording module of the first equipment unit;
recording the presence of the additional equipment unit proximate the first equipment unit over the duration of time to the recording module; and
comparing the recorded quantity over the duration of time with the recorded presence over the duration of time;
wherein correspondence in time of a change in the recorded quantity with appearance and disappearance of the additional equipment unit indicates an occurrence of the crop transfer event between the first equipment unit and the additional equipment unit.

11. The method of claim 1, further comprising:
counting the number of transfer events for the first equipment unit that are in the transfer event dataset;
comparing the number of counted transfer events with a maintenance schedule for the first equipment unit; and
determining a maintenance state of the first equipment unit based on the comparison.

12. The method of claim 1, wherein the detecting of the additional equipment unit as proximate the first equipment unit is based on sensing, with the identification device sensor, a near-field tag mounted on the additional equipment unit.

13. A system for tracking crop inventory, the system comprising:
a memory configured to store a transfer event dataset;
a processor in communication with the memory, the processor configured for:
receiving a plurality of measurements of a quantity of crop from a quantity sensor of a first equipment unit;
receiving data from an identification device sensor provided on the first equipment unit that indicates an identification device provided on an additional equipment unit as being proximate the first equipment unit;
identifying the additional equipment unit by receiving an identifier from the identification device with the identification device sensor;
detecting a change in the quantity of crop in the first equipment unit based on the plurality of measurements;
detecting a disappearance of the additional equipment unit proximate the first equipment unit with the identification device sensor;
determining a change in the quantity of crop in the first equipment unit between the detecting of the additional equipment unit being proximate the first equipment unit and the disappearance of the additional equipment unit proximate the first equipment unit;
determining a crop transfer event based on the detected change in the quantity of crop in the first equipment unit while proximate the additional equipment unit;
tracking the quantity of crop by associating the measurement of the quantity of crop with its associated equipment;
wherein the crop transfer event describes a transfer of crops from the first equipment unit to the additional equipment unit;
updating the transfer event dataset to include the crop transfer event;
identifying the crop transfer event in the transfer event dataset based upon an association with the additional equipment unit;
identifying a subsequent crop transfer event in the transfer event dataset based upon an association with the additional equipment unit, wherein the subsequent crop transfer event occurs after the crop transfer event and before any other crop transfer event associated with the additional equipment;
comparing the crop transfer event and the subsequent crop transfer event; and
determining a crop loss event based on the comparing,
wherein the first equipment unit is operable to hold a quantity of crop, and
wherein the additional equipment unit is operable to at least one of: hold a quantity of crop; and transfer a quantity of crop.

14. The system of claim 13, wherein the quantity sensor is operable to indicate a flow rate of crop from the first equipment unit over time, and the change in the quantity of crop in the first equipment unit is detected based on measuring a flow of crop through the first equipment unit during a period of time.

15. The system of claim 13, wherein the processor is further configured for:

identifying the at least one additional equipment unit by receiving an identifier from the identification device of the additional equipment unit with an identification device sensor of the first equipment unit; and
creating the crop transfer event in the transfer event dataset, the crop transfer event including the time of the detected change in quantity of crop, an identifier of the first equipment unit and the identifier of the additional equipment unit.

16. The system of claim 15 wherein the processor is further configured for:
determining a location of at least one of the first equipment unit and the additional equipment unit with a positioning module of the first equipment unit at the time of the detected change in quantity of crop; and
wherein the crop transfer event includes the determined location.

17. The system of claim 15, wherein the processor is further configured for:
identifying an operator of at least one of the first equipment unit and the at least one additional equipment unit by receiving an operator identifier from an operator identification with a communication module of the first equipment unit at the time of the detected change in quantity of crop;
wherein the crop transfer event includes the operator identifier.

18. The system of claim 13, wherein the processor is further configured for:
determining an amount of the change in quantity of crop in the first equipment unit; and
wherein the crop transfer event further includes the amount of change.

19. The system of claim 18, wherein the processor is further configured for:
storing a global quantity of crops on the memory, wherein the global quantity of crops describes quantities of crops associated with each of a plurality of equipment units, the plurality of equipment units comprising the first equipment unit and the additional equipment unit; and
updating the global quantity of crops based on the amount of change of the crop transfer event to reflect a new quantity of crop associated with each of the first equipment unit and the additional equipment unit.

20. The system of claim 13, wherein determining the change includes receiving a first measurement of the quantity of crop at a first time corresponding to the detecting of the additional equipment unit being proximate the first equipment unit and receiving a second measurement of the quantity of crop at a second time corresponding to the disappearance of the additional equipment unit proximate the first equipment unit.

21. The system of claim 13, wherein the quantity sensor is operable to indicate a flow rate of crop over time, and wherein determining the change includes monitoring the flow rate of the crop to and from the first equipment unit between a first time corresponding to the detecting of the additional equipment unit being proximate the first equipment unit and a second time corresponding to the disappearance of the additional equipment unit proximate the first equipment unit.

22. The system of claim 13, wherein the processor is further configured for:
receiving a crop identifier from an identification device of the additional equipment unit with an identification device sensor of the first equipment unit;

determining a type of crop associated to the additional equipment unit based on the crop identifier; and raising an alarm on a user interface module of the first equipment unit if the type of crop associated to the additional equipment unit does not match a type of crop associated with the first equipment unit.

23. The system of claim 13, wherein the processor is further configured for:

recording the quantity of crop in the first equipment unit over a duration of time to a recording module of the first equipment unit;

recording the presence of the additional equipment unit proximate the first equipment unit over the duration of time to the recording module; and comparing the recorded quantity over the duration of time with the recorded presence over the duration of time;

wherein correspondence in time of a change in the recorded quantity with appearance and disappearance of the additional equipment unit indicates an occurrence of the crop transfer event between the first equipment unit and the additional equipment unit.

24. The system of claim 13, wherein the processor is further configured for:

counting the number of transfer events for the first equipment unit that are in the transfer event dataset;

comparing the number of counted transfer events with a maintenance schedule for the first equipment unit; and determining a maintenance state of the first equipment unit based on the comparison.

25. The system of claim 13, wherein the detecting of the additional equipment unit as proximate the first equipment unit is based on sensing, with the identification device sensor, a near-field tag mounted on the additional equipment unit.

26. A tracking unit configured to be coupled with an equipment unit for harvesting crop, the tracking unit comprising:

a recording module for storing measurements of quantities of crops;

a communications module;

an identification device sensor; and a calculation unit comprising a processor and a memory, the processor configured to:

receive a plurality of measurements of a quantity of a crop from a quantity sensor of a coupled equipment unit;

detect the presence of an identification device provided on an additional equipment unit proximate the coupled equipment unit with the identification device sensor;

identify the additional equipment unit by receiving an identifier from the identification device with the identification device sensor;

detect a disappearance of the additional equipment unit proximate the coupled equipment unit with the identification device sensor;

determine a change in the quantity of crop in the coupled equipment unit between the detecting of the additional equipment unit being proximate the first equipment unit and the disappearance of the additional equipment unit proximate the first equipment unit;

determine a crop transfer event based on the detected change in the quantity of crop in the coupled equipment unit while proximate the additional equipment unit, wherein the crop transfer event describes a transfer of crops from the coupled equipment unit to the additional equipment unit and includes an identifier of the coupled equipment unit and the identifier of the additional equipment unit;

track the quantity of crop by associating the change in the quantity of crop with its associated equipment;

transmit the crop transfer event to a server with the communications module;

identify the crop transfer event in the transfer event dataset based upon an association with the additional equipment unit;

identify a subsequent crop transfer event in the transfer event dataset based upon an association with the additional equipment unit, wherein the subsequent crop transfer event occurs after the crop transfer event and before any other crop transfer event associated with the additional equipment;

compare the crop transfer event and the subsequent crop transfer event; and determine a crop loss event based on the comparing, wherein the coupled equipment unit is operable to hold a quantity of crop, and wherein the additional equipment unit is operable to at least one of: hold a quantity of crop; and transfer a quantity of crop.

27. The tracking unit of claim 26, wherein the plurality of measurements are associated with a flow of crop through the coupled equipment unit during a period of time.

\* \* \* \* \*